(12) United States Patent
Zampini

(10) Patent No.: US 10,030,844 B2
(45) Date of Patent: Jul. 24, 2018

(54) SYSTEMS, METHODS AND APPARATUS FOR ILLUMINATION USING ASYMMETRICAL OPTICS

(71) Applicant: Integrated Illumination Systems, Inc., Morris, CT (US)

(72) Inventor: Mark Alphonse Zampini, Morris, CT (US)

(73) Assignee: Integrated Illumination Systems, Inc., Morris, CT (US)

(*) Notice: Subject to any disclaimer, the term of this patent is extended or adjusted under 35 U.S.C. 154(b) by 99 days.

(21) Appl. No.: 15/166,548

(22) Filed: May 27, 2016

(65) Prior Publication Data

US 2016/0348855 A1 Dec. 1, 2016

Related U.S. Application Data

(60) Provisional application No. 62/168,512, filed on May 29, 2015.

(51) Int. Cl.

| | |
|---|---|
| *F21V 1/00* | (2006.01) |
| *F21V 5/08* | (2006.01) |
| *G02B 19/00* | (2006.01) |
| *F21V 7/00* | (2006.01) |
| *F21W 131/405* | (2006.01) |

(Continued)

(52) U.S. Cl.
CPC ............ *F21V 5/08* (2013.01); *G02B 19/0014* (2013.01); *G02B 19/0061* (2013.01); *A47B 2220/0077* (2013.01); *A47F 11/10* (2013.01); *F21V 7/005* (2013.01); *F21V 7/0008* (2013.01); *F21V 7/22* (2013.01); *F21W 2131/301* (2013.01); *F21W 2131/405* (2013.01); *F21Y 2103/10* (2016.08); *F25D 27/00* (2013.01)

(58) Field of Classification Search
USPC .......................... 362/217.02, 217.04, 217.05
See application file for complete search history.

(56) References Cited

U.S. PATENT DOCUMENTS

| | | |
|---|---|---|
| 4,139,770 A | 2/1979 | Beyersdorf |
| 5,264,997 A | 11/1993 | Hutchisson et al. |

(Continued)

FOREIGN PATENT DOCUMENTS

WO    WO-03/017733 A1    2/2003

OTHER PUBLICATIONS

"1-Wire Products Deliver a Powerful Combination . . . ", Mixed-Signal Design Guide, Dallas Semiconductor Maxim, 2005, 7 pages.

(Continued)

*Primary Examiner* — Vip Patel
(74) *Attorney, Agent, or Firm* — Foley & Lardner LLP

(57) ABSTRACT

The present solution provides a light fixture having an asymmetric optic configured to illuminate multiple surfaces of an enclosure. The light fixture can be attached to a location adjacent to and above a first shelf of a plurality shelves of the enclosure. The optic can split light from the light source to form a first light beam directed to the first shelf and form a second light beam directed to a second shelf of the plurality of shelves. The second shelf can be below the first shelf. The first light beam can have a first predetermined intensity and the second light beam has a second predetermined intensity different than the first predetermined intensity.

19 Claims, 9 Drawing Sheets

(51) Int. Cl.
  F25D 27/00    (2006.01)
  A47F 11/10    (2006.01)
  F21V 7/22     (2018.01)
  F21W 131/301  (2006.01)
  F21Y 103/10   (2016.01)

(56) References Cited

U.S. PATENT DOCUMENTS

| | | |
|---|---|---|
| 5,465,199 A | 11/1995 | Bray et al. |
| 5,561,346 A | 10/1996 | Byrne |
| 5,783,909 A | 7/1998 | Hochstein |
| 5,803,579 A | 9/1998 | Turnbull et al. |
| 5,909,429 A | 6/1999 | Satyanarayana et al. |
| 5,947,587 A | 9/1999 | Keuper et al. |
| 6,013,988 A | 1/2000 | Bucks et al. |
| 6,016,038 A | 1/2000 | Mueller et al. |
| 6,040,663 A | 3/2000 | Bucks et al. |
| 6,094,014 A | 7/2000 | Bucks et al. |
| 6,127,783 A | 10/2000 | Pashley et al. |
| 6,147,458 A | 11/2000 | Bucks et al. |
| 6,150,774 A | 11/2000 | Mueller et al. |
| 6,157,093 A | 12/2000 | Giannopoulos et al. |
| 6,166,496 A | 12/2000 | Lys et al. |
| 6,194,839 B1 | 2/2001 | Chang |
| 6,201,353 B1 | 3/2001 | Chang et al. |
| 6,211,626 B1 | 4/2001 | Lys et al. |
| 6,234,645 B1 | 5/2001 | Borner et al. |
| 6,234,648 B1 | 5/2001 | Borner et al. |
| 6,236,331 B1 | 5/2001 | Dussureault |
| 6,238,065 B1 | 5/2001 | Jones |
| 6,249,088 B1 | 6/2001 | Chang |
| 6,250,774 B1 | 6/2001 | Begemann et al. |
| 6,253,530 B1 | 7/2001 | Price et al. |
| 6,288,497 B1 | 9/2001 | Chang et al. |
| 6,292,901 B1 | 9/2001 | Lys et al. |
| 6,299,329 B1 | 10/2001 | Mui et al. |
| 6,304,464 B1 | 10/2001 | Jacobs et al. |
| 6,305,818 B1 | 10/2001 | Lebens et al. |
| 6,340,864 B1 | 1/2002 | Wacyk |
| 6,340,868 B1 | 1/2002 | Lys et al. |
| 6,384,545 B1 | 5/2002 | Lau |
| 6,411,046 B1 | 6/2002 | Muthu |
| 6,441,558 B1 | 8/2002 | Muthu et al. |
| 6,443,592 B1 | 9/2002 | Unger et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 | 12/2002 | Muthu et al. |
| 6,507,158 B1 | 1/2003 | Wang |
| 6,507,159 B2 | 1/2003 | Muthu |
| 6,510,995 B2 | 1/2003 | Muthu et al. |
| 6,513,949 B1 | 2/2003 | Marshall et al. |
| 6,528,954 B1 | 3/2003 | Lys et al. |
| 6,552,495 B1 | 4/2003 | Chang |
| 6,576,881 B2 | 6/2003 | Muthu et al. |
| 6,577,080 B2 | 6/2003 | Lys et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,609,813 B1 | 8/2003 | Showers et al. |
| 6,617,795 B2 | 9/2003 | Bruning |
| 6,621,235 B2 | 9/2003 | Chang |
| 6,630,801 B2 | 10/2003 | Schuurmans |
| 6,636,003 B2 | 10/2003 | Rahm et al. |
| 6,639,368 B2 | 10/2003 | Sheoghong |
| 6,676,284 B1 | 1/2004 | Wynne Willson |
| 6,692,136 B2 | 2/2004 | Marshall et al. |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,762,562 B2 | 7/2004 | Leong |
| 6,777,891 B2 | 8/2004 | Lys et al. |
| 6,788,011 B2 | 9/2004 | Mueller et al. |
| 6,796,680 B1 | 9/2004 | Showers et al. |
| 6,796,686 B2 | 9/2004 | Jacob et al. |
| 6,801,003 B2 | 10/2004 | Schanberger et al. |
| 6,806,659 B1 | 10/2004 | Mueller et al. |
| 6,831,569 B2 | 12/2004 | Wang et al. |
| 6,853,150 B2 | 2/2005 | Clauberg et al. |
| 6,853,151 B2 | 2/2005 | Leong et al. |
| 6,859,644 B2 | 2/2005 | Wang |
| 6,922,022 B2 | 7/2005 | Bucks et al. |
| 6,930,452 B2 | 8/2005 | De Krijger et al. |
| 6,932,477 B2 | 8/2005 | Stanton |
| 6,933,685 B2 | 8/2005 | Gutta et al. |
| 6,933,767 B2 | 8/2005 | Bucks et al. |
| 6,965,205 B2 | 11/2005 | Piepgras et al. |
| 6,969,954 B2 | 11/2005 | Lys |
| 6,972,525 B2 | 12/2005 | Bucks et al. |
| 6,975,079 B2 | 12/2005 | Lys et al. |
| 6,992,803 B2 | 1/2006 | Chang |
| 6,998,594 B2 | 2/2006 | Gaines et al. |
| 7,014,336 B1 | 3/2006 | Ducharme et al. |
| 7,030,572 B2 | 4/2006 | Nijhof et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,064,498 B2 | 6/2006 | Dowling et al. |
| 7,067,992 B2 | 6/2006 | Leong et al. |
| 7,071,762 B2 | 7/2006 | Xu et al. |
| 7,113,541 B1 | 9/2006 | Lys et al. |
| 7,118,248 B2 | 10/2006 | Wynne Willson |
| 7,132,804 B2 | 11/2006 | Lys et al. |
| 7,135,824 B2 | 11/2006 | Lys et al. |
| 7,139,617 B1 | 11/2006 | Morgan et al. |
| 7,140,752 B2 | 11/2006 | Ashdown |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,202,641 B2 | 4/2007 | Claessens et al. |
| 7,204,622 B2 | 4/2007 | Dowling et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,255,458 B2 | 8/2007 | Ashdown |
| 7,256,554 B2 | 8/2007 | Lys |
| 7,262,559 B2 | 8/2007 | Tripathi et al. |
| 7,267,461 B2 | 9/2007 | Kan et al. |
| 7,274,160 B2 | 9/2007 | Mueller et al. |
| 7,300,192 B2 | 11/2007 | Mueller et al. |
| 7,308,296 B2 | 12/2007 | Lys et al. |
| 7,309,965 B2 | 12/2007 | Dowling et al. |
| 7,314,289 B2 | 1/2008 | Montagne |
| 7,319,298 B2 | 1/2008 | Jungwirth et al. |
| 7,323,676 B2 | 1/2008 | Duijve |
| 7,329,998 B2 | 2/2008 | Jungwirth |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,929 B2 | 4/2008 | Mueller et al. |
| 7,358,961 B2 | 4/2008 | Zwanenburg |
| 7,387,405 B2 | 6/2008 | Ducharme et al. |
| 7,388,665 B2 | 6/2008 | Ashdown |
| 7,394,210 B2 | 7/2008 | Ashdown |
| 7,420,335 B2 | 9/2008 | Robinson et al. |
| 7,423,387 B2 | 9/2008 | Robinson et al. |

(56) References Cited

U.S. PATENT DOCUMENTS

| | | | |
|---|---|---|---|
| 7,432,668 B2 | 10/2008 | Zwanenburg et al. | |
| 7,443,209 B2 | 10/2008 | Chang | |
| 7,449,847 B2 | 11/2008 | Schanberger et al. | |
| 7,453,217 B2 | 11/2008 | Lys et al. | |
| 7,459,864 B2 | 12/2008 | Lys | |
| 7,462,997 B2 | 12/2008 | Mueller et al. | |
| 7,463,070 B2 | 12/2008 | Wessels | |
| 7,482,565 B2 | 1/2009 | Morgan et al. | |
| 7,482,760 B2 | 1/2009 | Jungwirth et al. | |
| 7,490,953 B2 | 2/2009 | Holten et al. | |
| 7,490,957 B2 | 2/2009 | Leong et al. | |
| 7,495,671 B2 | 2/2009 | Chemel et al. | |
| 7,502,034 B2 | 3/2009 | Chemel et al. | |
| 7,505,395 B2 | 3/2009 | Ashdown et al. | |
| 7,507,001 B2 | 3/2009 | Kit | |
| 7,511,436 B2 | 3/2009 | Xu | |
| 7,511,437 B2 | 3/2009 | Lys et al. | |
| 7,515,128 B2 | 4/2009 | Dowling | |
| 7,520,634 B2 | 4/2009 | Ducharme et al. | |
| 7,521,872 B2 | 4/2009 | Bruning | |
| 7,525,254 B2 | 4/2009 | Lys et al. | |
| 7,538,499 B2 | 5/2009 | Ashdown | |
| 7,542,257 B2 | 6/2009 | McCormick et al. | |
| 7,550,931 B2 | 6/2009 | Lys et al. | |
| 7,550,935 B2 | 6/2009 | Lys et al. | |
| 7,557,521 B2 | 7/2009 | Lys | |
| 7,569,807 B2 | 8/2009 | Matheson | |
| 7,572,028 B2 | 8/2009 | Mueller et al. | |
| 7,573,209 B2 | 8/2009 | Ashdown et al. | |
| 7,573,210 B2 | 8/2009 | Ashdown et al. | |
| 7,573,729 B2 | 8/2009 | Elferich et al. | |
| 7,598,681 B2 | 10/2009 | Lys et al. | |
| 7,598,684 B2 | 10/2009 | Lys et al. | |
| 7,598,686 B2 | 10/2009 | Lys et al. | |
| 7,619,370 B2 | 11/2009 | Chemel et al. | |
| 7,652,236 B2 | 1/2010 | Cortenraad et al. | |
| 7,654,703 B2 | 2/2010 | Kan et al. | |
| 7,656,366 B2 | 2/2010 | Ashdown | |
| 7,658,506 B2 | 2/2010 | Dowling | |
| 7,659,673 B2 | 2/2010 | Lys | |
| 7,659,674 B2 | 2/2010 | Mueller et al. | |
| 7,665,883 B2 | 2/2010 | Matheson | |
| 7,667,409 B2 | 2/2010 | Geerts et al. | |
| 7,675,238 B2 | 3/2010 | Cortenraad et al. | |
| 7,687,753 B2 | 3/2010 | Ashdown | |
| 7,688,002 B2 | 3/2010 | Ashdown et al. | |
| 7,689,130 B2 | 3/2010 | Ashdown | |
| 7,703,951 B2 | 4/2010 | Piepgras et al. | |
| 7,710,369 B2 | 5/2010 | Dowling | |
| 7,712,926 B2 | 5/2010 | Matheson | |
| 7,714,521 B2 | 5/2010 | Qian | |
| 7,731,387 B2 | 6/2010 | Cortenraad et al. | |
| 7,731,389 B2 | 6/2010 | Draganov et al. | |
| 7,731,390 B2 | 6/2010 | Van Gorkom et al. | |
| 7,737,643 B2 | 6/2010 | Lys | |
| 7,738,002 B2 | 6/2010 | Ashdown et al. | |
| 7,740,375 B2 | 6/2010 | Zou et al. | |
| 7,766,489 B2 | 8/2010 | Duine et al. | |
| 7,766,518 B2 | 8/2010 | Piepgras et al. | |
| 7,772,787 B2 | 8/2010 | Ashdown et al. | |
| 7,777,427 B2 | 8/2010 | Stalker, III | |
| 7,781,979 B2 | 8/2010 | Lys | |
| 7,802,902 B2 | 9/2010 | Moss et al. | |
| 7,806,558 B2 | 10/2010 | Williamson | |
| 7,808,191 B2 | 10/2010 | Wu | |
| 7,809,448 B2 | 10/2010 | Lys et al. | |
| 7,810,974 B2 | 10/2010 | Van Rijswick et al. | |
| 7,845,823 B2 | 12/2010 | Mueller et al. | |
| 7,850,347 B2 | 12/2010 | Speier et al. | |
| 7,854,539 B2 | 12/2010 | Van Duijneveldt | |
| 7,868,562 B2 | 1/2011 | Salsbury et al. | |
| 7,878,683 B2 | 2/2011 | Logan et al. | |
| 7,878,688 B2 | 2/2011 | Paulussen et al. | |
| 7,893,631 B2 | 2/2011 | Speier | |
| 7,893,661 B2 | 2/2011 | Ackermann et al. | |
| 7,894,050 B2 | 2/2011 | Ashdown et al. | |
| 7,906,917 B2 | 3/2011 | Tripathi et al. | |
| 7,911,151 B2 | 3/2011 | Xu | |
| 7,914,173 B2 | 3/2011 | Paulussen et al. | |
| 8,022,632 B2 | 9/2011 | Schulz et al. | |
| 8,026,673 B2 | 9/2011 | Lys | |
| 9,200,782 B1* | 12/2015 | Erickson | F21V 13/04 |
| 9,512,978 B1* | 12/2016 | Wimberly | F21V 7/041 |
| 2002/0074559 A1 | 6/2002 | Dowling et al. | |
| 2003/0132721 A1 | 7/2003 | Jacobs et al. | |
| 2003/0133292 A1 | 7/2003 | Mueller et al. | |
| 2004/0052076 A1 | 3/2004 | Mueller et al. | |
| 2004/0090191 A1 | 5/2004 | Mueller et al. | |
| 2004/0178751 A1 | 9/2004 | Mueller et al. | |
| 2005/0236998 A1 | 10/2005 | Mueller et al. | |
| 2005/0275626 A1 | 12/2005 | Mueller et al. | |
| 2006/0002110 A1 | 1/2006 | Dowling et al. | |
| 2006/0067079 A1* | 3/2006 | Noh | F21V 7/0091 362/327 |
| 2006/0076908 A1 | 4/2006 | Morgan et al. | |
| 2006/0114201 A1 | 6/2006 | Chang | |
| 2006/0152172 A9 | 7/2006 | Mueller et al. | |
| 2006/0221606 A1 | 10/2006 | Dowling | |
| 2006/0262521 A1 | 11/2006 | Piepgras et al. | |
| 2006/0274526 A1 | 12/2006 | Weston et al. | |
| 2006/0290624 A1 | 12/2006 | Ashdown | |
| 2007/0063658 A1 | 3/2007 | Van Der Veeken | |
| 2007/0086912 A1 | 4/2007 | Dowling et al. | |
| 2007/0115658 A1 | 5/2007 | Mueller et al. | |
| 2007/0145915 A1 | 6/2007 | Roberge et al. | |
| 2007/0153514 A1 | 7/2007 | Dowling et al. | |
| 2007/0230159 A1 | 10/2007 | Cortenraad et al. | |
| 2007/0258240 A1 | 11/2007 | Ducharme et al. | |
| 2007/0273290 A1 | 11/2007 | Ashdown et al. | |
| 2008/0013325 A1* | 1/2008 | Shiau | F21V 5/04 362/326 |
| 2008/0042599 A1 | 2/2008 | Ashdown | |
| 2008/0043464 A1 | 2/2008 | Ashdown | |
| 2008/0048582 A1 | 2/2008 | Robinson | |
| 2008/0062413 A1 | 3/2008 | Ashdown et al. | |
| 2008/0089060 A1 | 4/2008 | Kondo et al. | |
| 2008/0094005 A1 | 4/2008 | Rabiner et al. | |
| 2008/0122386 A1 | 5/2008 | De Brouwer et al. | |
| 2008/0136331 A1 | 6/2008 | Schmeikal | |
| 2008/0136796 A1 | 6/2008 | Dowling | |
| 2008/0140231 A1 | 6/2008 | Blackwell et al. | |
| 2008/0164826 A1 | 7/2008 | Lys | |
| 2008/0164854 A1 | 7/2008 | Lys | |
| 2008/0167734 A1 | 7/2008 | Robinson et al. | |
| 2008/0183081 A1 | 7/2008 | Lys et al. | |
| 2008/0239675 A1 | 10/2008 | Speier | |
| 2008/0265797 A1 | 10/2008 | Van Doorn | |
| 2008/0278092 A1 | 11/2008 | Lys et al. | |
| 2008/0278941 A1 | 11/2008 | Logan et al. | |
| 2008/0290251 A1 | 11/2008 | Deurenberg et al. | |
| 2008/0297066 A1 | 12/2008 | Meijer et al. | |
| 2008/0298330 A1 | 12/2008 | Leitch | |
| 2008/0315798 A1 | 12/2008 | Diederiks et al. | |
| 2009/0002981 A1 | 1/2009 | Knibbe | |
| 2009/0021175 A1 | 1/2009 | Wendt et al. | |
| 2009/0021182 A1 | 1/2009 | Sauerlaender | |
| 2009/0072761 A1 | 3/2009 | Wessels | |
| 2009/0128059 A1 | 5/2009 | Joosen et al. | |
| 2009/0134817 A1 | 5/2009 | Jurngwirth et al. | |
| 2009/0160364 A1 | 6/2009 | Ackermann et al. | |
| 2009/0168415 A1 | 7/2009 | Deurenberg et al. | |
| 2009/0179587 A1 | 7/2009 | Van Der Veen et al. | |
| 2009/0179596 A1 | 7/2009 | Willaert et al. | |
| 2009/0189448 A1 | 7/2009 | Verschueren | |
| 2009/0224695 A1 | 9/2009 | Van Erp et al. | |
| 2009/0230884 A1 | 9/2009 | Van Doorn | |
| 2009/0243507 A1 | 10/2009 | Lucero-Vera et al. | |
| 2009/0278473 A1 | 11/2009 | Van Erp | |
| 2009/0284174 A1 | 11/2009 | Sauerlander et al. | |
| 2009/0321666 A1 | 12/2009 | Hilgers | |
| 2010/0007600 A1 | 1/2010 | Deurenberg et al. | |
| 2010/0026191 A1 | 2/2010 | Radermacher et al. | |
| 2010/0045478 A1 | 2/2010 | Schulz et al. | |
| 2010/0072901 A1 | 3/2010 | De Rijck et al. | |

(56) References Cited

U.S. PATENT DOCUMENTS

| | | |
|---|---|---|
| 2010/0072902 A1 | 3/2010 | Wendt et al. |
| 2010/0079085 A1 | 4/2010 | Wendt et al. |
| 2010/0079091 A1 | 4/2010 | Deixler et al. |
| 2010/0084995 A1 | 4/2010 | Baaijens et al. |
| 2010/0091488 A1 | 4/2010 | Ijzerman et al. |
| 2010/0094439 A1 | 4/2010 | Van De Meulenhof et al. |
| 2010/0102732 A1 | 4/2010 | Peeters et al. |
| 2010/0117543 A1 | 5/2010 | Van Der Veen et al. |
| 2010/0117656 A1 | 5/2010 | Snelten |
| 2010/0118531 A1 | 5/2010 | Montagne |
| 2010/0127633 A1 | 5/2010 | Geerts et al. |
| 2010/0134041 A1 | 6/2010 | Radermacher et al. |
| 2010/0134042 A1 | 6/2010 | Willaert |
| 2010/0148689 A1 | 6/2010 | Morgan et al. |
| 2010/0164399 A1 | 7/2010 | Radermacher et al. |
| 2010/0165618 A1 | 7/2010 | Vissenberg et al. |
| 2010/0171771 A1 | 7/2010 | Otte et al. |
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0231133 A1 | 9/2010 | Lys |
| 2010/0231363 A1 | 9/2010 | Knibbe |
| 2010/0244707 A1 | 9/2010 | Gaines et al. |
| 2010/0244734 A1 | 9/2010 | Van Herpen et al. |
| 2010/0259182 A1 | 10/2010 | Man et al. |
| 2010/0264834 A1 | 10/2010 | Gaines et al. |
| 2010/0271843 A1 | 10/2010 | Holten et al. |
| 2010/0289532 A1 | 11/2010 | Wendt et al. |
| 2010/0301780 A1 | 12/2010 | Vinkenvleugel |
| 2010/0308745 A1 | 12/2010 | Delnoij |
| 2011/0025205 A1 | 2/2011 | Van Rijswick et al. |
| 2011/0025230 A1 | 2/2011 | Schulz et al. |
| 2011/0035404 A1 | 2/2011 | Morgan et al. |
| 2011/0042554 A1 | 2/2011 | Hilgers et al. |
| 2011/0090684 A1 | 4/2011 | Logan et al. |
| 2011/0095694 A1 | 4/2011 | Justel et al. |
| 2011/0285292 A1 | 11/2011 | Mollnow et al. |
| 2011/0291812 A1 | 12/2011 | Verbrugh |
| 2012/0019670 A1 | 1/2012 | Chang et al. |

OTHER PUBLICATIONS

"Conductivity with the BS2/OWL2", EME Systems, 2002, pp. 1-3.
"Dimmable Fluorescent Ballast", ATAVRFBKIT/EVLB001, User Guide, ATMEL, 2007, 35 pages.
"Understanding Boost Power Stages in Switchmode Power Supplies", Application Report, Texas Instruments, Mixed Signal Products, Mar. 1999, 32 pages.
"Understanding Buck Power Stages in Switchmode Power Supplies", Application Report, Texas Instruments, Mixed Signal Products, Mar. 1999, 36 pages.
Barberis, C. "Precision current sink costs less than $20", EDN Design Ideas, 43(6), 1998, 2 pages.
Bellcomb Technologies Incorporated, "Edges, Joiners, Attachments", Web Address: http://www.bellcomb.com/caps/edges.htm, Apr. 22, 2007, pp. 1-3.
Bookmarks Menu—Controllers/Wireless—Deisgn Ideas, dated Dec. 6, 2012, 1 pg.
Bowling, S. "Buck-Boost LED Driver Using the PIC16F785 MCU", Microchip, AN1047, 2006, pp. 1-12.
By Staff, DALI Delivers Control and Cost Savings, Headaches Too, Consulting-Specifying Engineer, Jun. 2002, 2 pages.
Canny, D. "Controlling slew times tames EMI in offline supplies", EDN Design Ideas, Nov. 14, 2002.
Control Freak Addict Data Sheet, Copyright 2008, Creative Lighting, 5 pages.
Curtis, K. "High Power IR LED Driver Using the PIC16C781/782", Microchip, TB062, 2002, pp. 1-8.
CybroTech, Managing Lights with Dali, TN-012, rev 2, Cybrotech Ltd., 2007, 11 pgs.
Cypress Perform, Implementing an Integrated DMX512 Receiver, Item ID: 39762, Dec. 16, 2009, 1 pg.
Cypress Semiconductor Corporation, PowerPSoC (R) Intelligent LED Driver, Document No: 001-46319, Rev. *G, 2009, 52 pages.
Dali-AG website, Dali at work, 1 pg., last update Apr. 8, 2010.
Davidovic, et al., Lead-Acid Battery Charger Becomes a Subfuction in a Microcontroller, The Authority on Emerging Technologies for Design Solutions, Mar. 2007, 2 pages.
Davmark Ltd., Dali-Protocol, 2007, 6 pages.
Di Jasio, "A Technique to Increase the Frequency Resolution of PICmicro MCU PWM Modules", Microchip, AN1050, 2006, pp. 1-10.
Dietz, et al. "Very Low-Cost Sensing and Communication Using Bidirectional LEDs", Mitsubishi Electric Research Laboratories, Jul. 2003, 19 pgs.
Distler, T. "LED Effects Stream TM v2.0 Protocol (Revision C)", Jun. 2, 2005, pp. 1-5.
Dunn, J. "Matching MOSFET Drivers to MOSEFTs", Microchip, AN799, 2004, pp. 1-10.
Fosler, R. "The RS-232/DALI Bridge Interface", Microchip, AN811, 2002, pp. 1-8.
Fosler, R. "Use a microcontroller to design a boost converter", EDN design ideas, Mar. 4, 2004, pp. 74-75.
Fosler, R., et al. "Digitally Addressable DALI Dimming Ballast", Microchip, AN809, 2002, pp. 1-18.
Ghulyani, L. "Simple MPPT-Based Lead Acid Charger Using bq2031", Texas Instruments, Dec. 2009, pp. 1-5.
Goder, D. "Scheme provides high-side current sensing for white-LED drivers", EDN, 1 page, Feb. 19, 2004.
Google Search Results for dali query group, search completed on Apr. 8, 2010, accessed at google.com, http://www.google.com/search?hl=en&client=firefox-a&rls=org.mozilla:en-, 2 pages.
Hardwick, M. "DC power wire also carries clock or data", EDN Design Ideas, Mar. 13, 1998, 1 page.
Hexcel Composites, "Sandwich Panel Fabrication Technology", Web Address: http://www.hexcel.com/NR/rdonlyres/B4574C2C-0644-43AC-96E2-CC15967A4b)5/4547 Sandwich Fabrication.pdf, Jan. 1997, pp. 1-16.
High-Side Current Monitor, ZETEX, Apr. 2001, ZXCT1009, Issue 3, pp. 1-8.
Implementing Infrared Object Detection, http://web.archive.org/web/20080528042614rejwww.seattlerobotics.org/guide/infrared.html, original publication date known, retrieved Apr. 7, 2010, seattlerobotics.org, 4 pages.
Jackson, S. "Circuit protects bus from 5V swings", EDN Design Ideas, Nov. 14, 2002, pp. 102.
Klepin, K. "Temperature Compensation for High Brightness LEDs using EZ-Color (TM) and PSoC Express", Cypress Perform, AN14406, Aug. 10, 2007, pp. 1-4.
Kremin, V. et al. "Multichannel LED Dimmer with CapSense Control—AN13943", Cypress Perform, Jul. 20, 2007, 5 pages.
Kropf, B. "Firmware—RGB Color Mixing Firmware for EZ-Color (TM)—AN16035", Cypress Perform, Jun. 13, 2007, pp. 1-7.
Lager, A. "Use a 555 timer as a switch-mode power supply", EDN Design Ideas, Nov. 14, 2002, 1 page.
Lee, M. Shunt Battery Charger Provides 1A Continuous Current, EDN Magazine, 1997.
Locher, R. "Introduction to Power MOSEFETs and their Applications", Fairchild Semiconductor (TM), Application Note 558, Rev B, Oct. 1998, 15 pgs.
McArthur, R., "Making Use of Gate Charge to Design the Gate Drive Circuit for Power MOSEFETs and IGBTs data sheets", International Rectifier, Application Note AN-944, Advanced Power Technology, 5 pgs., 2001.
Miller, R. "Digital addressable lighting interface protocol fosters systems interoperability for lower costs and greater design flexibility", RNM Engineering, Inc., Apr. 2003, pp. 1-20.
Nell, S. "VCO uses programmable logic", EDN Design Ideas, Nov. 14, 2002, 1 page.
News & Events DALI Digital addressable lighting interface lamp luminaire control, accessed at http://www.dali-ag.org/ on Apr. 8, 2010, original publication date unknown, updated Apr. 8, 2010, 1 pg.

(56) References Cited

OTHER PUBLICATIONS

O'Loughlin, M. "350-W, Two-Phase Interleaved PFC Pre-regulator Design Review", Texas Instruments, Application Report, Revised Mar. 2007, 21 pages.
O'Loughlin, M., PFC Pre-Regulator Frequency Dithering Circuit, Texas Instruments, May 2007, pp. 1-8.
Perrin, R. Inexpensive Relays Form Digital Potentiometer, EDN Design Ideas, 1998, 2 pages.
Petersen, A. "Harness solar power with smart power-conversion techniques", EDN, Green Electronics designfeature, Feb. 4, 1999, pp. 119-124.
Prendergast, P. "How to Design a Three-Channel LED Driver", Cypress Perform, Jan. 2008, pp. 1-9.
Renesas, R8C/25 Demonstration Example for DALI Lighting Protocol Stack, REU05B0O77-0100/Rev. 1.00, Jul. 2008, 14 pgs.
Richardson, C., Matching Driver to LED, National Semiconductor, Jan. 2008, 5 pgs.
Richardson. C., LM3404 Driving a Seoul Semi Zpower P4 1A LED-RD-134, National Semiconductor, Apr. 2007, 6 pages.
Shanmugam, S. "Design of a linear Fresnel lens system for solar photovoltaic electrical power source", Proc. SPIE 4572, Intelligent Robots and Computer Vision XX: Algorithms, Techniques, and Active Vision, 556, Oct. 5, 2001, 8 pages.
Shill, M. "Simple logic probe uses bicolor LED", EDN Design Ideas, Mar. 13, 1998, 2 pages.
Software Design Specification, Z-Wave Protocol Overview, Z wave the wireless language, Zensys A/S, May 9, 2007, 20 pages.
Soundlight, Operating Manual, DALI and DMX Dekoder 7064A-H Mk1, 2008, 8 pgs.
Takahashi A., Methods and Features of LED Drivers, National Semiconductor, Mar. 2008, 3 pgs.
Universal Powerline Bus Communication Technology, Overview, PCS Powerline Control Systems UPB (Universal Powerline Bus), Jan. 8, 2002, pp. 1-13.
UPB Technology Description, PCS—Powerline Control Systems, UPB (Universal Powerline Bus), Version 1.4, Apr. 16, 2007, 68 pages.
Van Dorsten, Arian, A Low Cost Step-up Converter by IC 555, posted Jul. 21, 2007, http://www.eleccircuit.comla-low-cost-step-up-converter-by-ic-5551, retrieved Apr. 7, 2010, 2 pages.
Walma, K., DALI: Forerunner of Today's Breakthrough Lighting Technology, Feb. 2007, 2 pages.
Wikipedia, Digital Addressable Lighting Interface, original publication date unknown, Retrieved from:Retrieved from "http://en.wikipedia.org/wikiJDigital_Addressable_Lighting_Interface" accessed on Apr. 8, 2010, 3 pages.
Witt, J. "Switched-capacitor regulator provides gain", EDN Design Ideas, Mar. 13, 1998, 2 pages.
Wojslaw, C. "DPP adds versatility to VFC", EDN, design ideas, Nov. 14, 2002, 1 page.
Young, R. "Power circuit terminates DDR DRAMs", EDN Design Ideas, Nov. 14, 2002, 1 page.
Zarr, R. Driving High-Power LEDs, Machine Design, Oct. 2007, 3 pages.
Zensys ASCII Interface, VIZIA, 2007, 12 pages.
Z-Wave Vizia Etc thread, retrieved at http://groups.google.com/group/comp.home.automation/browse_thread/thread/449c2c66934dfSfb/fSl12116a8231aa1 ?lnk=st&q=z-wave&rnum=98#fSl12116a8231aa1, www.ztech.com, 18 pages, 2007.

\* cited by examiner

SYSTEMS, METHODS AND APPARATUS FOR ILLUMINATION USING ASYMMETRICAL OPTICS

CROSS-REFERENCES TO RELATED APPLICATIONS

This application claims priority to, and the benefit of, U.S. Provisional Application No. 62/168,512, filed May 29, 2015, which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE INVENTION

The present application is generally related to illumination using asymmetrical optics.

BACKGROUND

Enclosures or cases such as a refrigerator may use a single lighting fixture with a light source located in a portion of the enclosure to illuminate multiple surfaces in the enclosure, such as a top shelf and a bottom shelf. Thus, an enclosure may rely on the single lighting fixture to illuminate multiple surfaces of the enclosure. Due to light being subject to the inverse square law, doubling the distance from an object (e.g., a top shelf versus a bottom shelf) to a light source reduces the intensity by a factor of four. These inefficiencies lead to wasted light in an attempt to provide enough light on a surface, or uneven illumination. It may be challenging to evenly illuminate multiple portions in an environment.

SUMMARY

To address the challenges of efficiently providing even illumination or an even amount of light intensity on multiple surfaces in an enclosure using a single lighting fixture, apparatus, systems and methods of the present solution provide for an asymmetric optic that is configured to evenly illuminate multiple portions of an enclosure. In at least one aspect, an optic of the light fixture is designed to provide light distribution to multiple surfaces of an enclosure (e.g., top shelf and bottom shelf) without spill over light into other surfaces of the enclosure (e.g., an aisle way of the enclosure). The optic can be further designed and constructed to provide lateral distribution of light, which may allow for even illumination along a length of the enclosure or case.

In some embodiments, the apparatus includes a lighting fixture. A portion of the lighting fixture, such as an enclosure of the lighting fixture, may be made using an extrusions technique. The dimensions of the optic can be selected based on one or more factors. In some embodiments, the optic may include a one inch diameter such that the optic can be positioned, placed, fixed to, or otherwise assembled in an enclosure (e.g., a standard fluorescent bulb enclosure used in a commercial display fridge).

The lighting fixture may include a single row of light sources. The light sources may include light emitting diodes ("LEDs"). The LEDs may emit light onto a surface of the fridge via, for example, an optic. The optic may be or include an asymmetrical optic. The asymmetric optic may be designed and constructed to distribute light emitted from the light source in multiple directions. For example, the asymmetric optic may distribute light from the light source such that there is a substantially even illumination on multiple surfaces. Substantial illumination may refer to a factor of less than 3, plus or minus 10%, plus or minus 5%, plus or minus 1 to 15%, for example.

At least one aspect is directed to a system including a light fixture. The light fixture can include a light source. The light fixture can be configured to be attached to a location adjacent to and above a first shelf of a plurality shelves. The light fixture can include an optic configured to split light from the light source to form a first light beam directed to the first shelf and form a second light beam directed to a second shelf of the plurality of shelves. The second shelf can be below the first shelf. The first light beam can have a first predetermined intensity and the second light beam has a second predetermined intensity different than the first predetermined intensity.

In some embodiments, the optic can be configured to form the first light beam with the first predetermined intensity and the second light beam with the second predetermined intensity based on a predetermined ratio. The predetermined ratio can be based on a first distance between the topic of the light fixture and the first shelf, and a second distance between the optic of the light fixture and the second shelf. The second distance can be greater than the first distance.

In some embodiments, the optic can be further configured to form the first light beam with the first predetermined intensity and the second light beam with the second predetermined intensity based on a predetermined ratio of 1 to 3. The light source can include one or more light emitting diodes (LEDs) configured to emanate light via the optic. The light source can include a plurality of light emitting diodes (LEDs) aligned to direct light to the optic.

In some embodiments, the light source can include a plurality of light emitting diodes (LEDs) configured to direct light to the optic. A first LED of the plurality of LEDs can be aligned in a first direction, and a second LED of the plurality of LEDs can be aligned in a second direction different from the first direction.

In some embodiments, the optic can include an asymmetric optic configured to form the first light beam directed to the first shelf and form the second light beam directed to the second shelf. In some embodiments, the optic can include an exterior portion that is symmetric, and an interior portion adjacent to the light source that is asymmetric. The optic can include an interior portion having a first predetermined angle to form the first beam and a second predetermined angle to form the second beam. The second beam can be formed via the second predetermined angle has a greater intensity than the first beam formed via the first predetermined angle.

Another aspect is directed to a method. The method can include providing, in an enclosure comprising a plurality of shelves, a light fixture having a light source and an optic. The method can include attaching the light fixture to a location in the enclosure adjacent to and above a first shelf of the plurality shelves. The optic of the light fixture can be configured to split light from the light source to form a first light beam directed to the first shelf and form a second light beam directed to a second shelf of the plurality of shelves. The second shelf can be below the first shelf. The first light beam can have a first predetermined intensity and the second light beam can have a second predetermined intensity different than the first predetermined intensity.

In some embodiments, the optic forms the first light beam with the first predetermined intensity and the second light beam with the second predetermined intensity based on a predetermined ratio.

In some embodiments, the predetermined ratio is based on a first distance between the topic of the light fixture and the first shelf, and a second distance between the optic of the light fixture and the second shelf, the second distance greater than the first distance.

In some embodiments, the optic forms the first light beam with the first predetermined intensity and the second light beam with the second predetermined intensity based on a predetermined ratio of 1 to 3.

In some embodiments, the light source includes one or more light emitting diodes (LEDs) configured to emanate light via the optic. In some embodiments, the light source includes a plurality of light emitting diodes (LEDs) aligned to direct light to the optic. In some embodiments, the light source includes a plurality of light emitting diodes (LEDs) configured to direct light to the optic. A first LED of the plurality of LEDs can be aligned in a first direction, and a second LED of the plurality of LEDs aligned in a second direction different from the first direction.

Yet another aspect is directed to a method that includes splitting, by an optic of a light fixture attached adjacent to and above a first shelf of a plurality shelves in an enclosure, light emanated from the light source to form a first light beam with a first predetermined intensity and a second light beam with a second predetermined intensity different than the first predetermined intensity. The method can include directing, by the light fixture, the first light beam to the first shelf and the second light beam to the second shelf, the second shelf below the first shelf.

In some embodiments, the optic includes an asymmetric optic that forms the first light beam directed to the first shelf and forms the second light beam directed to the second shelf.

In some embodiments, the optic includes an interior portion having a first predetermined angle to form the first beam and a second predetermined angle to form the second beam, wherein the second beam formed via the second predetermined angle has a greater intensity than the first beam formed via the first predetermined angle.

BRIEF DESCRIPTION OF THE DRAWINGS

The foregoing and other objects, aspects, features, and advantages of the present invention will become more apparent and better understood by referring to the following description taken in conjunction with the accompanying drawings, in which.

The features and advantages of the present invention will become more apparent from the detailed description set forth below when taken in conjunction with the drawings, in which like reference characters identify corresponding elements throughout.

DETAILED DESCRIPTION

Apparatus, systems and methods of the present solution provide for even illumination of multiple surfaces using an asymmetrical optic. The multiple surfaces may include, e.g., multiple shelves in a cabinet, enclosure, fridge, or other enclosure or encasing having multiple shelves located at different distances (e.g., a top shelf and a bottom shelf). In some embodiments, the asymmetrical optic is designed and constructed such that the asymmetrical optic can be placed in, or otherwise integrated or used with a fridge. For example, the asymmetrical optic may include a 1 inch diameter that allows the optic to be placed in a standard fluorescent tube enclosure.

Figure 1:
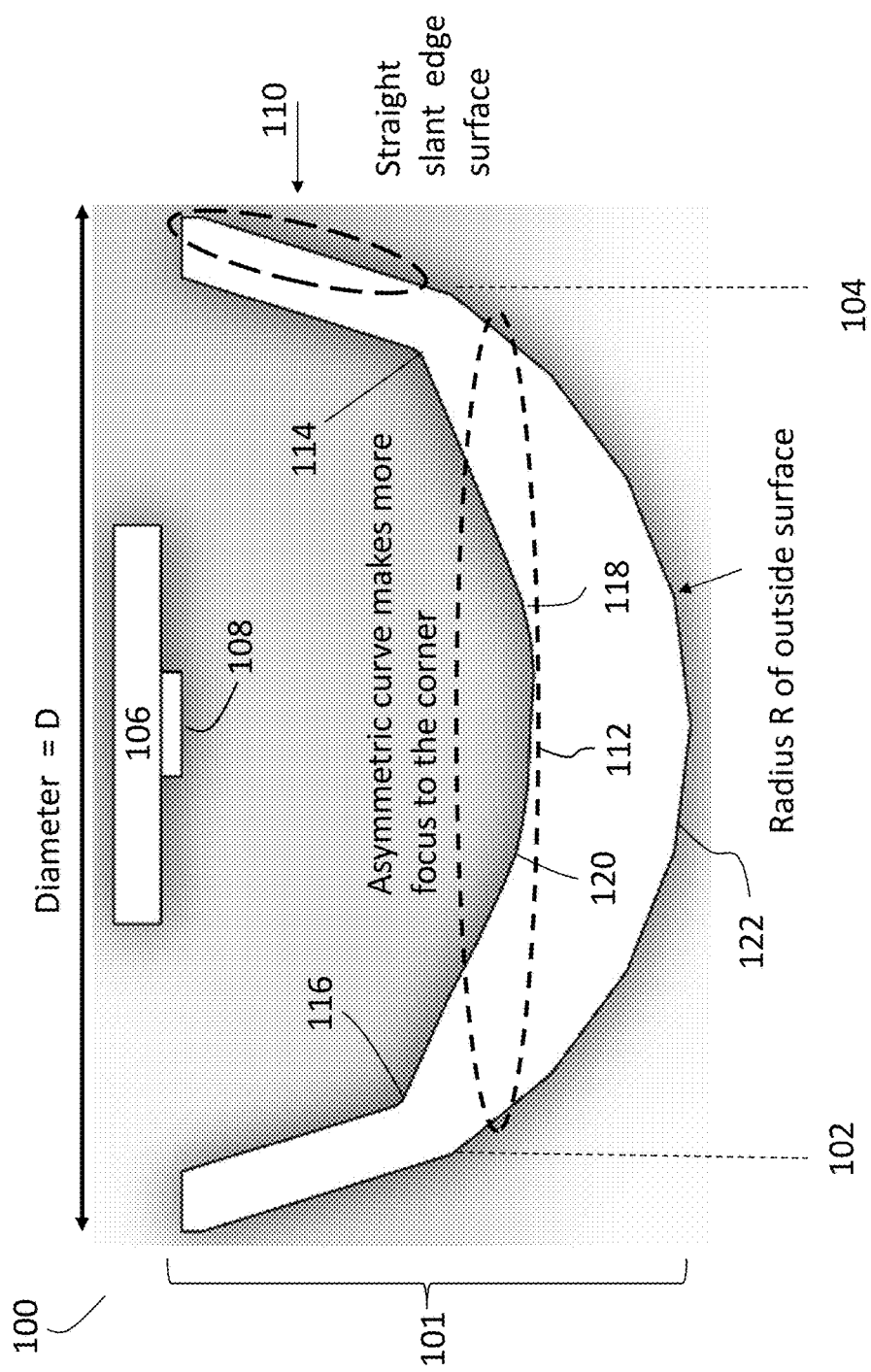
FIG. 1 is a diagram depicting a system including an example light fixture including an asymmetrical optic and light source in accordance with an embodiment.

Referring now to FIG. 1, a diagram depicting an example light fixture including an asymmetrical optic and light source in accordance with an embodiment is shown. In brief overview, the light fixture 100 includes an optic 101 (e.g., asymmetrical optic 101). The light fixture 100 may include a light source 108, such as a LED 108. The light fixture may include a component 106 such as a driver, controller, extrusion, power source, or other component configured to positioned the light source 108 or power or control light source 108.

Still referring to FIG. 1, and in further detail, the light fixture 100 includes a light source 108 and an optic 101. The optic 101 may include an asymmetrical optic 101. The optic 101 may be referred to as an asymmetrical optic 101 because the optic distributes light in a certain manner. For example, the optic 101 may include an asymmetric curve 112 that focuses light more towards a corner of the optic 101. For example, the light fixture can be attached to a location adjacent to and above a first shelf of a plurality of shelves. In this example, the optic 101 can split light from the light source 108 to form a first light beam directed to a first shelf and form a second light beam directed to a second shelf of the plurality of shelves that is below the first shelf. By using the optic 101 to split the light beam, the optic 101 can provide a first light beam that has a first predetermined intensity and a second light beam that has a second predetermined intensity different than the first predetermined intensity.

The asymmetric optic 101 may include a radius R. The radius may refer to a radius of an outside surface. The radius may be, e.g., 1 inch, which may allow the optic 101 to be positioned or placed in a standard fluorescent light enclosure. The diameter D may refer to a width of the light fixture 101 from a first edge to a second edge. The diameter D may be 1 inch, in some embodiments. In some embodiments, the diameter D may be 1 inch. In some embodiments, the radius R may refer to a distance between points 102 and 104. Points 102 and 104 may refer to intersection, vertex, or corner along an external edge of the optic 101. The optic 101 may include corresponding internal vertex points 116 and 114. The optic 101 may include a straight slant edge surface 110.

The asymmetrical portion 112 of the optic 101 may include multiple vertex points 118 and 120 or curved portions there between that form the asymmetrical portion 112 of the optic 101. The asymmetric portion 112 of the optic 101 can form the first light beam directed to the first shelf and form the second light beam directed to the second shelf. The optic 101 can include an exterior portion 122 that is symmetric, while the interior portion 112 adjacent to the light source 108 is an asymmetric portion 112. Thus, the optic can include an interior portion 112 having a first predetermined angle to form the first beam and a second predetermined angle (e.g., 120, 112, or 118) to form the second beam, where the second beam has a greater intensity than the first beam formed via the first predetermined angle (e.g., 120, 112 or 118).

The light source 108 may include any type of light source including. In some embodiments, light source includes a fluorescent light, lamp, light bulb, or one or more light emitting diodes of various colors (e.g., white, red, green, blue). In some implementations, the light source is a semiconductor light emitting device, such as a light emitting diode of any spectral or wavelength range. In a plurality of implementations, the light source is a broadband lamp or a broadband light source. In number of implementations, the light source is a black light. In a plurality of implementations, light source is a hollow cathode lamp. In a number of implementations, light source is a fluorescent tube light source. In some implementations, the light source is a neon or argon lamp. In a plurality of implementations, light source is a plasma lamp. In certain implementations, light source is a xenon flash lamp. In a plurality of implementations, light source is a mercury lamp. In some implementations, light source is a metal halide lamp. In certain implementations, light source is a sulfur lamp. In a number of implementations, light source is a laser, or a laser diode. In some implementations, light source is an OLED, PHOLED, QDLED, or any other variation of a light source utilizing an organic material. In certain implementations, light source is a monochromatic light source. In a number of implementations, light source is a polychromatic light source. In a plurality of implementations, light source is a light source emitting light partially in the spectral range of ultraviolet light. In some implementations, light source is a device, product or a material emitting light partially in the spectral range of visible light. In a number of implementations, light source is a device, product or a material partially emanating or emitting light in the spectral range of the infrared light. In a number of implementations, light source is a device, product or a material emanating or emitting light in the visible spectral range. In some implementations, light source includes a filter to control the spectral range of the light emitted from the light source. In certain implementations, light source includes a light guide, an optical fiber or a waveguide through which light is emitted from the light source. In some implementations, light source includes one or more mirrors for reflecting or redirecting of light. In some implementations, lighting device or fixture 100 reflects light emitted from another light source. In some implementations, light source includes a light reactive material affecting the light emitted, such as a polarizer, filter or a prism. In a plurality of implementations, light source is a coherent light source. In some implementations, light source, or a lighting device or fixture, is an incoherent light source.

The light source 108 can include one or more LEDs that are aligned to direct light to the optic 101. In some cases, a first one or more LEDs of the light source can be aligned in a first direction, and a second one or more LEDs can be aligned in a second direction different from the first direction. For example, a first LED can be aligned to direct light towards point 120 or 116 at the interior of the asymmetric optic. A second LED can be aligned to direct light towards point 118 or 114 of the interior of the asymmetric optic. In some embodiments, some or all of the LEDs in the light fixture or optic can be aligned in a same direction. Thus, if all the LEDs are aligned in a same direction, the optic can split the light and direct the two (or more) light beams towards their respective shelves in the enclosure.

Figure 2:
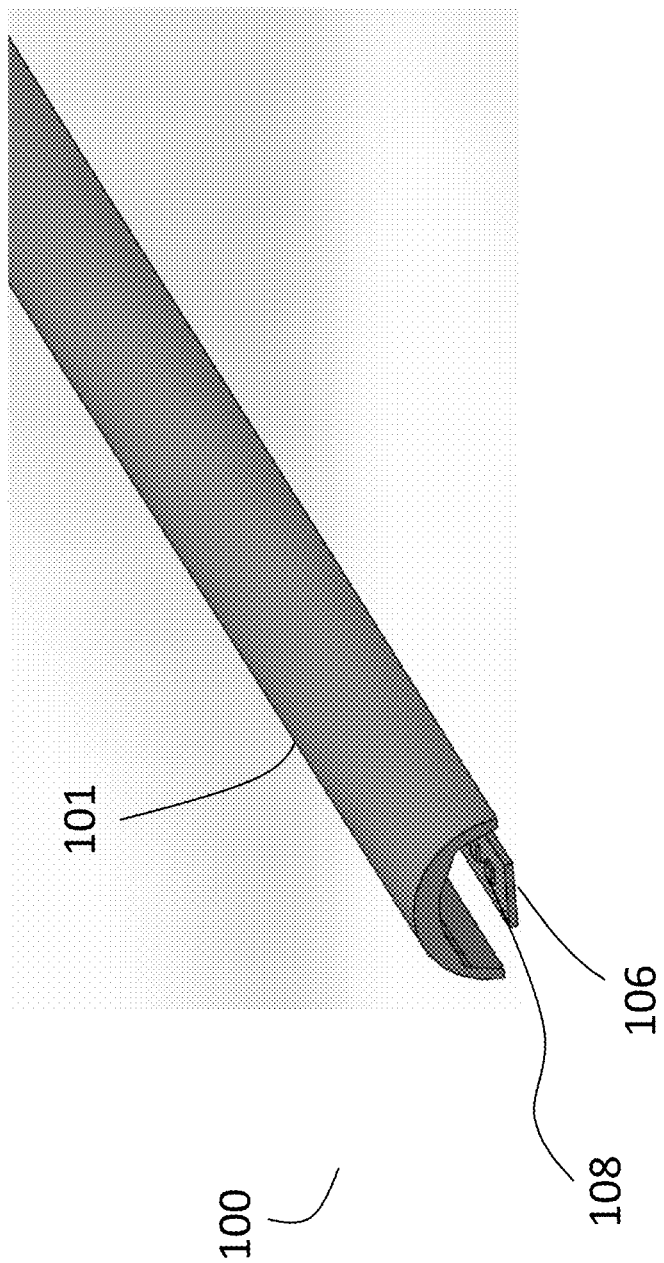
FIG. 2 is a diagram depicting a system including an example light fixture including an asymmetrical optic and light source in accordance with an embodiment.

FIG. 2 is a diagram depicting an example light fixture including an asymmetrical optic and light source in accordance with an embodiment. The light fixture 100 includes an optic 101, light source 108 and component 106. In some embodiments, the light emitted from light source 108 passes through optic 101. In some embodiments, light may be reflected off of optic 101.

Figure 3:
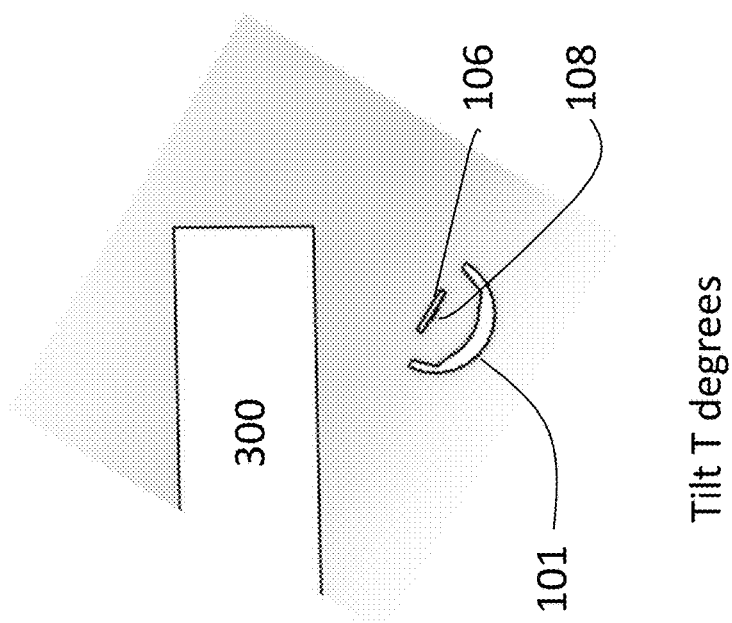
FIG. 3 is a diagram depicting a system including an example light fixture including an asymmetrical optic and light source positioned with a tilt, in accordance with an embodiment.

FIG. 3 is a diagram depicting an example light fixture including an asymmetrical optic and light source positioned with a tilt, in accordance with an embodiment. The optic 101 may be at a tilt of T degrees relative to a horizontal surface 300. The tilt may be, for example, 59 degrees, 50 degrees, 70 degrees or a value between 30 degrees and 80 degrees, in some embodiments. The optic 101 and light source 108 may be tilted based on an application for the light fixture 100.

Figures 4A, 4B:
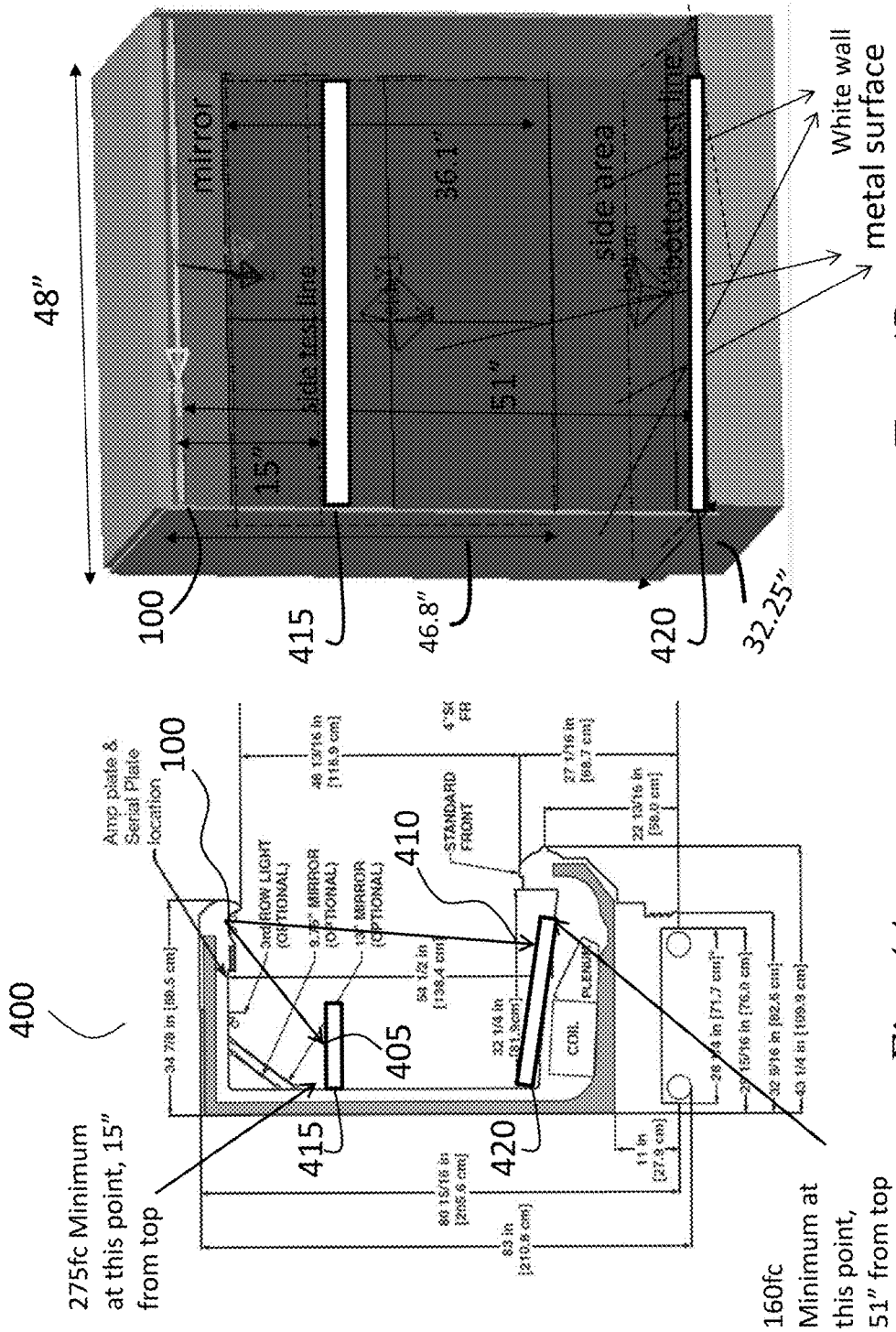
FIGS. 4A and 4B are diagrams depicting a system including an example case or enclosure comprising a light fixture including an asymmetrical optic and light source, in accordance with an embodiment.

FIGS. 4A and 4B are diagrams depicting an example case or enclosure comprising a light fixture 100 including an asymmetrical optic 101 and light source 108, in accordance with an embodiment. In this example embodiment, the light fixture 100 is placed in an enclosure 400. The light fixture 100 can be attached to a top of the enclosure. In some embodiments, the enclosure 400 can be a fridge. The enclosure 400 can include a plurality of shelves, such as a first shelf 415 and a second shelf 420. The light fixture 100 can be attached to a location in the enclosure adjacent to and above a first shelf of the plurality of shelves. The light fixture 100 can be attached to the enclosure with, for example, screws, nuts, bolts, latch, adhesive, tongue and groove, magnets, hook and loop fasteners, fasteners, or other attachment or coupling mechanisms. In some embodiments, attaching the light fixture 100 to the enclosure 400 can include building the light fixture 100 into the enclosure 400.

The distance between the light fixture 100 and the first shelf 415 can be less than the distance between the light fixture 100 and the second shelf 420. The distance between the light fixture 100 and the second shelf 420 can be greater than the distance between the light fixture 100 and the first shelf 415. The distance between the first and second shelves 415 and 420 and the light fixture 100 can be used to determine a ratio of intensity between a first light beam and a second light beam. For example, the optic can split light from the light source into a first beam and a second beam. The first beam may direct light towards the first shelf 415 that is closer to the light fixture 100, such as towards point 405. The second beam can direct light towards the second shelf 420 that is farther from the light fixture 100 than the first shelf 415. The optic 101 can be configured to provide a same or substantially similar intensity (e.g., within 1%, 2%, 3%, 5%, 10%, 25%, 30%) at a point (e.g., 405) on the first shelf 415 and a point (e.g., 410) on the second shelf 420. To provide a similar intensity on two different shelves that are at different distances from one another, the optic 101 can output two beams having different intensities. The intensity of the beam can refer to an intensity of the light as it outputs the optic 101 of the light fixture 100.

The intensity of the first beam and the second beam can be predetermined based on the distances between the shelves and the light fixture. For example, the optic 101 can be configured to form the first light beam with a first predetermined intensity and the second light beam with a second predetermined intensity based on a predetermined ratio. The predetermined ratio can be based on the distances. For example, the predetermined ratio can be a ratio of 1 to 3 such that the second beam has an intensity that is three times greater than the intensity of the first beam. The light fixture 100 (e.g., via optic 101) can direct the first light beam to the first shelf and the second light beam to the second shelf.

The light fixture 100 may be tilted at an angle, e.g., 59 degrees. The light fixture may include an asymmetrical optic 101 that distributes light. In this example, the light fixture 100 with the asymmetrical optic distributes light to two points 405 and 410. For example, the enclosure can include a plurality of shelves. By designing an asymmetrical optic with an outside radius of 1 inch and diameter of 1 inch, and a tilt of 59 degrees, the light fixture 100 can distributes a certain amount of light intensity at the portions 410 and 405. In this example, the light fixture provides 160 foot-candle of light intensity at point 410, which may be 51 inches from a top of the enclosure and refer to a bottom shelf. The lighting fixture may further provide 275 foot-candle of light intensity at point 405, which may refer to a top shelf and be closer to the top, such as 15 inches from a top of the enclosure 400.

For example, the inverse square law formula can describe the intensity of light at different distances from a light source. The intensity of light can be inversely proportional to the square of the distance. For example, the intensities at points 405 and 410 on shelves 415 and 420 can be the same intensity $I_s$, or the Intensity can be a ratio of one another, e.g., the intensity at point 405 can be $I_s$ and the intensity at point 410 can be $I_s/3$. The intensity for the first beam at the output of the optic 101 can be $I_1$; and the intensity for the second beam at the output of the optic 101 can be $I_2$. The distance between the optic 101 and the first shelf 415 can be $d_1$; and the distance between the optic 101 and the second shelf 420 can be $d_2$. Using the inverse square formula, if the intensity at point 405 and 410 is the same, then $I_s = I_1/(d_1)^2 = I_2/(d_2)^2$. Thus, to provide a same intensity at the two different shelves at different distances, the ratio of the intensity can be determined as follows: $I_1/I_2 = (d_1)^2/(d_2)^2$. However, if the intensity at point 410 is one-third the intensity at point 405 (or some other ratio such as ½, ¼, ⅕, ⅖, 2/7, 3/10, etc.), then the intensity at point 405 can be $I_s$ and the intensity at point 410 can be $I_s/3$. Using the inverse square formulate again, if the intensity at point 410 is one-third the intensity at point 405, then $I_s = I_1/(d_1)^2 = 3 \times I_2/(d_2)^2$. Thus, to provide this ratio of intensity at the two different shelves at different distances, the ratio of the intensity of the light beams as they emit the optic or light fixture 100 can be determined as follows: $I_1/I_2 = 3 \times (d_1)^2/(d_2)^2$.

FIG. 4B is another view of the enclosure 400 that illustrates a top shelf 15 inches from the top and a bottom shelf 51 inches from the top. The enclosure may include one or more mirror positioned on a horizontal surface or wall of the enclosure.

Figure 5:
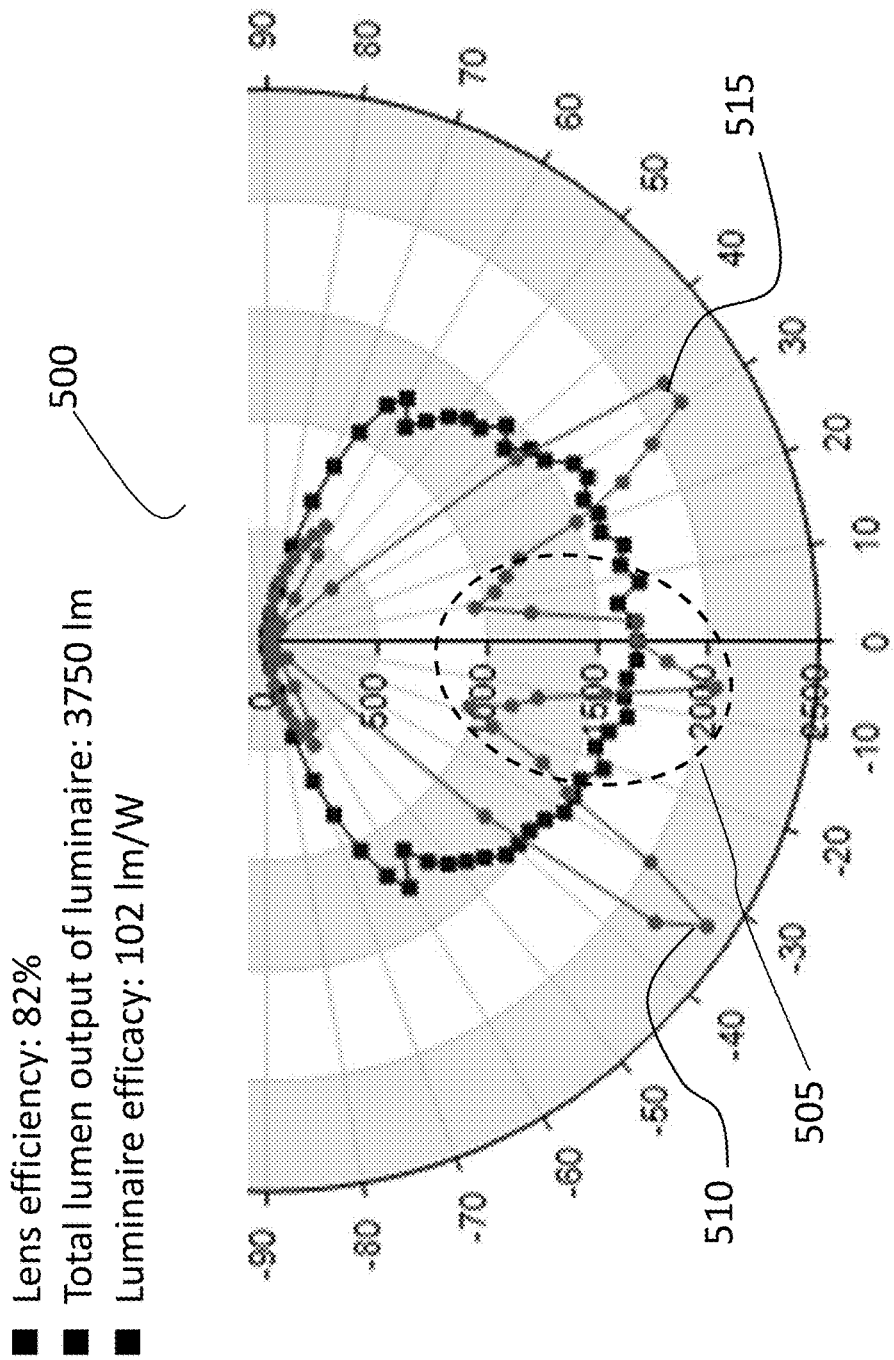
FIG. 5 is a diagram depicting an example light distribution simulation, in accordance with an embodiment.

FIG. 5 is a diagram depicting an example light distribution simulation, in accordance with an embodiment. The distribution chart 500 shows a lens or optic efficiency of 82%, a total lumen output of 3750 lumens, and a luminaire efficacy of 102 lm/W. As illustrated by portion 505, the asymmetrical optic can focus the light intensity at point 510 which is between negative 40 degrees and negative 30 degrees, and at point 515 which is at approximately positive 30 degrees. There is an additional light intensity at point 505 which is at approximately −10 degrees, but this is less intense than the points at approximately negative 30 degrees and positive 30 degrees. The asymmetrical optic is configured to focus light at these discrete portions 510 and 515, rather than uniformly across a range. The portion 510 can be directed towards a second shelf or bottom shelf that is further away from the light source relative to a top shelf or first shelf. And the portion 515 can be directed towards the top shelf or first shelf that is closer to the light source.

Figure 6:
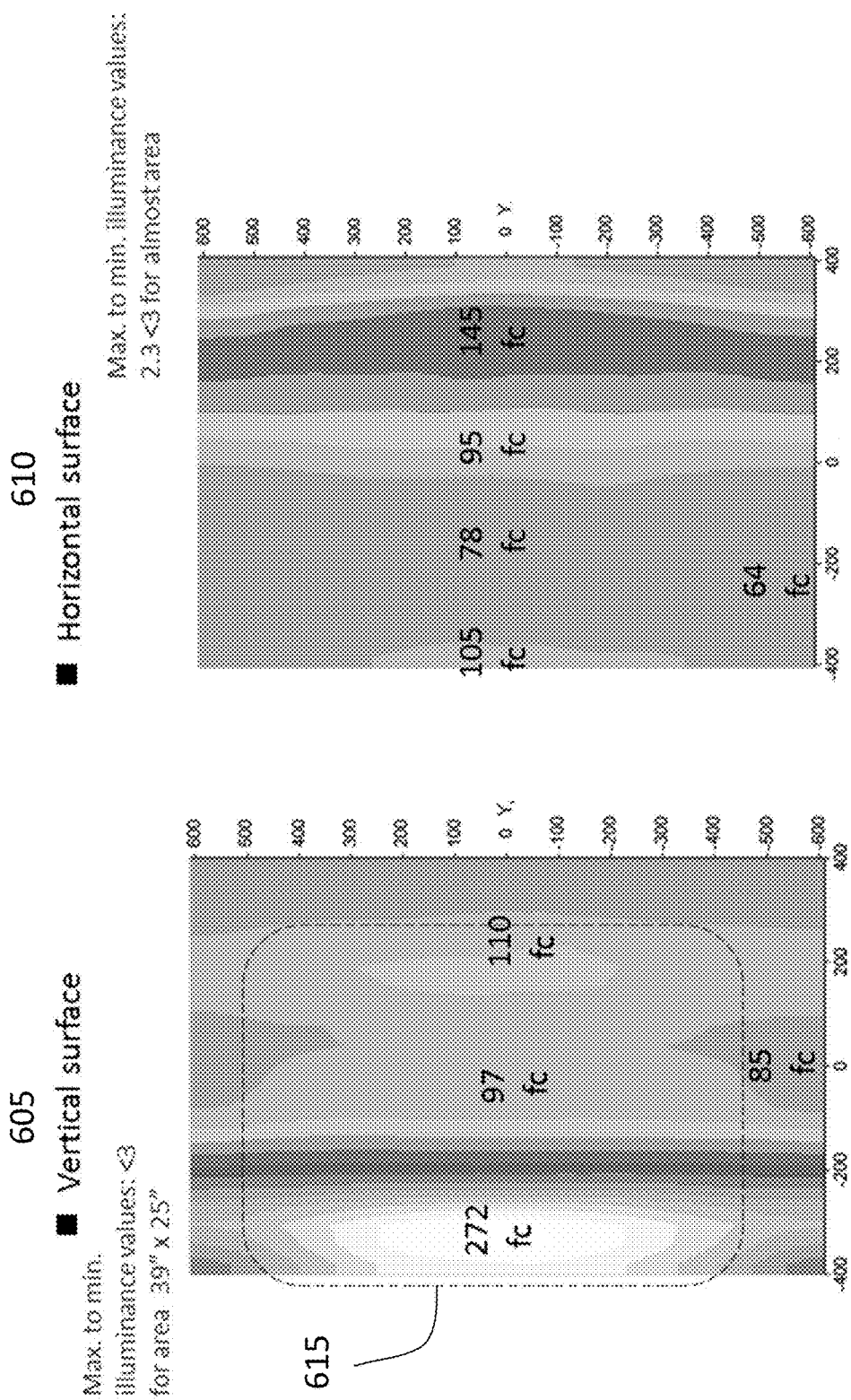
FIG. 6 is a diagram depicting an example light distribution simulation for a single light fixtures, in accordance with an embodiment.

FIG. 6 is a diagram depicting an example light distribution simulation for a single light fixtures, in accordance with an embodiment. As illustrated in this simulation, the max to min illuminance value is less than a factor of 3 in both the vertical surface 605 and the horizontal surface 610 for an area of about 39" by 25". The max illuminance value for the vertical surface 605 may be 272 fc, a middle illuminance value for the vertical surface may be 110 fc and a minimum illuminance value for the vertical surface may be 97 fc for the area identified by 615. The horizontal surface 610 may include illuminance values of 105 fc, 78 fc, 95 fc, and 145 fc. Thus, the max to min ratio for the horizontal surface is approximately 2.3, which is less than the factor of 3.

Figure 7:
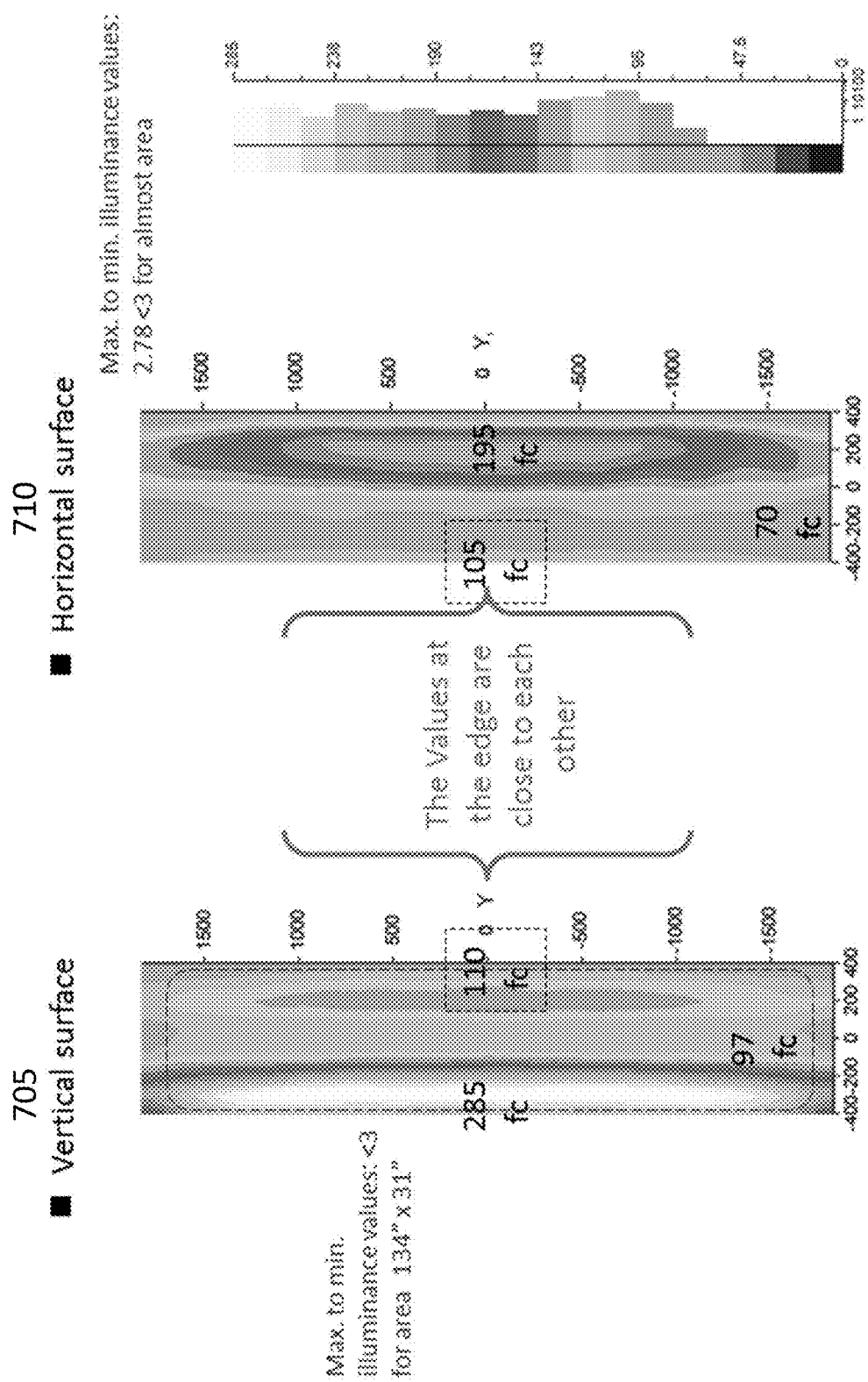
FIG. 7 is a diagram depicting an example light distribution simulation for three sets of light fixtures, in accordance with an embodiment.

FIG. 7 is a diagram depicting an example light distribution simulation for three sets of light fixtures, in accordance with an embodiment. Three sets of light fixtures may refer to either three light fixtures that are connected together, or one or more light fixtures that illuminate a larger area. For example, the light fixture may illuminate an area of 134 inches by 31 inches, while maintaining a max to min illuminance value of less than 3 for the vertical surface. The vertical surface 705 may include illuminance values of 285 fc, 97 fc, and 110 fc. The horizontal surface 710 may include illuminance values of 105 fc, 195 fc and 70 fc. Thus, in the horizontal surface 710, the light fixture can maintain a max to min illuminance value of 2.78 for the area. Further, the values at the edge of the vertical surface 705 and horizontal surface 710 are close to each other (e.g., 110 fc and 105 fc).

Figure 8:
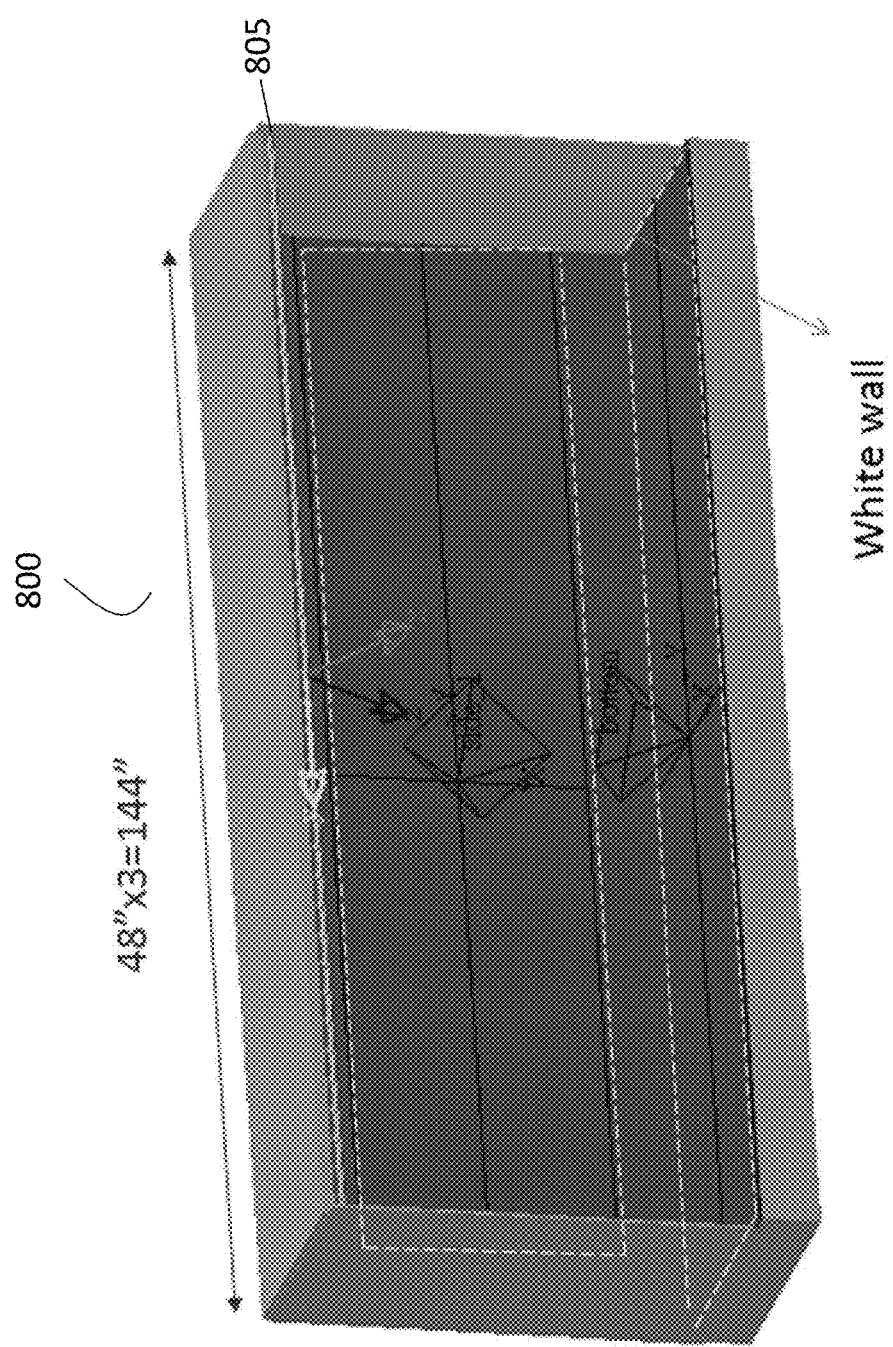
FIG. 8 is a diagram depicting an example of three sets of enclosures, in accordance with an embodiment.

FIG. 8 is a diagram depicting an example of three sets of enclosures, in accordance with an embodiment. This enclosure 800 may represent a fridge. The enclosure 800 may include three 48 inch wide enclosures, to form an enclosure of 144 inches. The light fixture may be positioned along edge 805, which may be a top edge of the enclosure 800. In some embodiments, the light fixture may be positioned at a bottom edge or side edge or other portion of an enclosure. The walls of the enclosure may include mirror or be painted with a reflective coating, such as a white paint.

Figure 9:
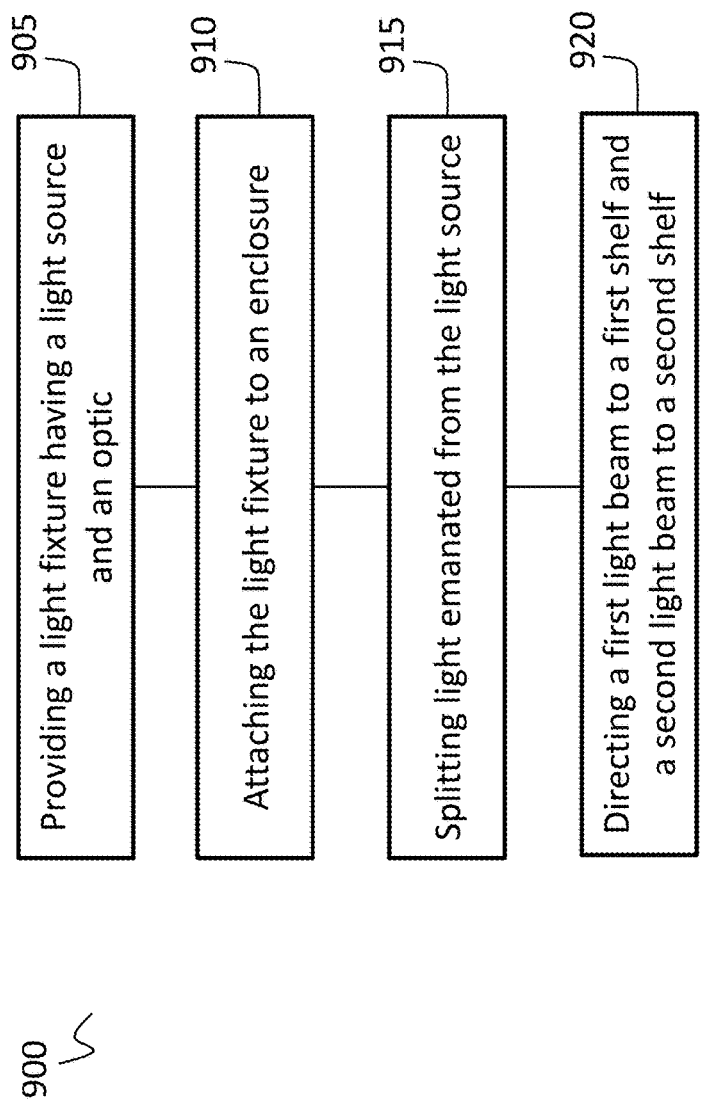
FIG. 9 is a flow diagram depicting a method of illuminating shelves in an enclosure, in accordance with an embodiment.

FIG. 9 is a flow diagram depicting a method of illuminating shelves in an enclosure, in accordance with an embodiment. The method 900 can include providing a light fixture having a light source and an optic at step 905. The light fixture can be provided in an enclosure. The enclosure can have multiple shelves.

At step 910, the method 900 includes attaching the light fixture to the enclosure. The light fixture can be attached at a location above one or more of the multiple shelves of the light fixture. The light fixture can be attached to a portion of an interior of the enclosure such that the light fixture can direct light towards one or more shelves, or another desired location inside or outside the enclosure. For example, the light fixture can be attached adjacent to and above a first shelf or top shelf inside the enclosure.

At step 915, the light fixture can split light emanated from the light source. For example, the optic of the light fixture can split light emanated from the light source to form a first light beam and a second light beam. For example, the optic can be an asymmetric optic configured to split light into light beams. In some embodiments, the light fixture can include multiple optics. In some embodiments, each of the multiple optics can split light into two or more beams. In some embodiments, a first optic directs a first light beam towards a first shelf, and a second optic directs a second light beam towards a second shelf.

At step 920, the light fixture can direct a first light beam to a first shelf and a second light beam to a second shelf. For example, the optic of the light fixture can direct the first light beam and the second light beam to respective shelves. The optic can direct the first light beam having a first predetermined intensity, and the second light beam having a second predetermined intensity.

Thus, systems, methods and apparatus of the present disclosure include a light fixture with an asymmetrical optic with an outside radius of 1 inch and a diameter of 1 inch that focuses light emitted by a light source toward a corner, thereby providing substantially even lighting (e.g., less than a factor of 3, less than a factor of 2, less than a factor of 4, etc.) to multiple portions of an enclosure.

Lighting fixture 100 may be any system including one or more lighting devices or light sources. Sometimes, the system includes one or more light sources or light fixtures controlled by one or more lighting system components. In a plurality of implementations, a lighting system includes a number of light source connected to each other. In a number of implementations, a lighting system includes a number of light sources connected to a power supply receptacle or a source of electricity, such as an electrical outlet. In many implementations, lighting system is a system comprising a plurality of light sources or other lighting system components connected to each other and communicating with each other. In a number of implementations, lighting system comprises a plurality of lighting system components electrically connected to each other in series or parallel via connector. In some implementations, lighting system comprises a plurality of lighting system components electrically connected to each other in series. In a plurality of implementations, lighting system comprises components, such as light sources connected to each other in parallel or in series or in a combination of parallel and series electrical connections. Sometimes, lighting system includes any number of systems, products, components or devices assisting any functionality, operation or control of light sources. In a number of implementations, lighting system includes one or more components, systems, products or devices assisting or controlling communication between a light source and another light source or another component, device, system or product. In a plurality of implementations, lighting system is any system comprising a plurality of light sources, such as light fixtures for example, illuminating or lighting an area or a space. In many implementations, lighting system is any system comprising a plurality of light sources, providing illumination or lighting an area or a space as controlled by one or more lighting system components.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "tool" or "computing device" or "system" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   a light fixture comprising a light source, wherein the light fixture is configured to be attached to a location adjacent to and above a first shelf of a plurality of shelves;
   an optic of the light fixture comprising an interior portion having a first angle to form a first light beam and a second angle to form a second light beam, the optic configured to split light from the light source to form the first light beam directed to the first shelf and form the second light beam directed to a second shelf of the plurality of shelves, the second shelf below the first shelf,
   wherein the first light beam formed via the first angle has a first intensity and the second light beam formed via the second angle has a second intensity greater than the first intensity.

2. The system of claim 1, wherein the optic is further configured to form the first light beam with the first intensity and the second light beam with the second intensity based on a ratio.

3. The system of claim 2, wherein the ratio is based on a first distance between the optic of the light fixture and the first shelf, and a second distance between the optic of the light fixture and the second shelf, the second distance greater than the first distance.

4. The system of claim 1, wherein the optic is further configured to form the first light beam with the first intensity and the second light beam with the second intensity based on a ratio of 1 to 3.

5. The system of claim 1, wherein the light source comprises one or more light emitting diodes (LEDs) configured to emanate light via the optic.

6. The system of claim 1, wherein the light source comprises a plurality of light emitting diodes (LEDs) aligned to direct light to the optic.

7. The system of claim 1, wherein the light source comprises a plurality of light emitting diodes (LEDs) configured to direct light to the optic, a first LED of the plurality of LEDs aligned in a first direction, and a second LED of the plurality of LEDs aligned in a second direction different from the first direction.

8. The system of claim 1, wherein the optic comprises an asymmetric optic configured to form the first light beam directed to the first shelf and form the second light beam directed to the second shelf.

9. The system of claim 1, wherein the optic comprises an exterior portion that is symmetric, and the interior portion adjacent to the light source that is asymmetric.

10. A method, comprising:
    providing, in an enclosure comprising a plurality of shelves, a light fixture having a light source and an optic having an interior portion with a first angle to form a first light beam and a second angle to form a second light beam;
    attaching the light fixture to a location in the enclosure adjacent to and above a first shelf of the plurality of shelves, the optic of the light fixture configured to split light from the light source to form the first light beam directed to the first shelf and form the second light beam directed to a second shelf of the plurality of shelves, the second shelf below the first shelf, wherein the first light beam formed via the first angle has a first intensity and the second light beam formed via the second angle has a second intensity greater than the first intensity.

11. The method of claim 10, wherein the optic forms the first light beam with the first intensity and the second light beam with the second intensity based on a ratio.

12. The method of claim 11, wherein the ratio is based on a first distance between the optic of the light fixture and the first shelf, and a second distance between the optic of the light fixture and the second shelf, the second distance greater than the first distance.

13. The method of claim 10, wherein the optic forms the first light beam with the first intensity and the second light beam with the second intensity based on a ratio of 1 to 3.

14. The method of claim 10, wherein the light source comprises one or more light emitting diodes (LEDs) configured to emanate light via the optic.

15. The method of claim 10, wherein the light source comprises a plurality of light emitting diodes (LEDs) aligned to direct light to the optic.

16. The method of claim 10, wherein the light source comprises a plurality of light emitting diodes (LEDs) configured to direct light to the optic, a first LED of the plurality of LEDs aligned in a first direction, and a second LED of the plurality of LEDs aligned in a second direction different from the first direction.

17. A method, comprising:
splitting, by an optic of a light fixture comprising an interior portion having a first angle and a second angle, light emanated from a light source to form a first light beam via the first angle with a first intensity and a second light beam via the second angle with a second intensity greater than the first intensity, the light fixture attached adjacent to and above a first shelf of a plurality of shelves in an enclosure; and directing, by the light fixture, the first light beam to the first shelf and the second light beam to a second shelf, the second shelf below the first shelf.

18. The method of claim 17, wherein the optic comprises an asymmetric optic that forms the first light beam directed to the first shelf and forms the second light beam directed to the second shelf.

19. The method of claim 17, wherein the optic comprises the interior portion having a first angle to form the first light beam and a second angle to form the second light beam, wherein the second light beam formed via the second angle has a greater intensity than the first light beam formed via the first angle.

* * * * *